Patented June 28, 1949

2,474,776

UNITED STATES PATENT OFFICE 2,474,776

HEXANEBISDIBUTYLAMIDE AS PLASTICIZER FOR BUTADIENE-ACRYLONITRILE COPOLYMER

Arthur W. Campbell, Terre Haute, Ind., assignor to Commercial Solvents Corporation, Terre Haute, Ind., a corporation of Maryland No Drawing. Application March 22, 1945,
Serial No. 584,245

1 Claim. (Cl. 260—32.6)

This invention relates to plasticizing of 1,3-butadiene-acrylonitrile copolymer with hexanebisdibutylamide.

In the manufacture and compounding of rubber and synthetic rubber, it is necessary to bring the compound into a plastic state so that pigments, fillers, and the like can be incorporated therein, and so that the product can be molded into the desired shape before vulcanizing. In the case of natural rubber, simple heating by the friction of milling on a roller mill induces the necessary degree of plasticity for these purposes.

The so-called synthetic rubbers or synthetic elastomers on the other hand do not respond easily to milling treatment and often become hard and brittle or crumble when subjected to such milling. It is, therefore essential to add to many of the synthetic elastomers softening or plasticizing agents to facilitate satisfactory milling and forming operations.

It is desirable that such softeners not only plasticize the elastomer, but that they shall not seriously decrease the tensile strength and stretching capacities of the plasticized material.

I have found that while many of the alkanebisdialkylamides are excellent plasticizers for synthetic elastomers, hexanebisdibutylamide produces surprisingly better results than any of the other compounds of this class which have been tested in plasticizing the copolymer of 1,3-butadiene and acrylonitrile. This copolymer is one of the more difficult of the synthetic elastomers to plasticize. Hexanebisdibutylamide imparts to this copolymer beneficial softening properties without appreciably lowering to the tensile strength and while increasing the elongation at break of the resulting composition.

Hexanebisdibutylamide may be prepared for example, by the following procedure: One mole of an ester of adipic acid is mixed in a distillation apparatus with two moles of dibutyl amine and heated until two moles of water have been eliminated. This water of reaction can be removed in any suitable known manner, for example by azeotropic distillation with a solvent such as benzene. The product remains in the distillation flask, and may be recovered and used as a plasticizer without further purification or it may be further purified by distillation, crystallization, or other appropriate method.

The amount of plasticizer utilized will vary with the degree of softness desired. Hexanebisdibutylamide can be employed in a wide range of proportions, and preferably within the range of concentrations varying from about ten to forty-five parts by weight of plasticizer for each 100 parts by weight of copolymer.

A convenient method for evaluating the effectiveness of a substance as a plasticizer comprises milling the substance in a standard rubber formula on a conventional rubber mill, and then measuring the extrusion time at various pressures in an extrusion plastometer, for example, in an instrument and according to a method similar to that described by J. H. Dillon in "Rubber Chemistry and Technology," vol. 9, pp. 496–501 (July 1936). In order to evaluate the effect of the plasticizer on the tensile and elongation properties of the elastomer, samples of the sheet are tested for these factors in the standard Scott tensile tester.

Tensile, elongation, and extrusion values as measured by the instruments above referred to, were run on several representative amides including the hexanebisdibutylamide of the present invention.

The plasticizer was added in each case in the indicated amount to the standard formula given below, and milled into the stock in the conventional manner.

Test Composition

| | Parts by weight |
|---|---|
| Butadiene-acrylonitrile copolymer | 100 |
| Zinc oxide | 5 |
| Stearic acid | 1 |
| Benzothiazyl disulfide | 1.5 |
| Sulfur | 1.5 |
| Carbon | 50 |
| Plasticizer | 30 |
| | 189.0 |

After milling, part of each sample was subjected to tensile and elongation tests, part was tested in the extrusion plastometer with the results given below:

Table

| Plasticizer | Tensile Strength at Break. lb./in.$^2$ | Elong. at Break, per cent | Extrusion Time in Seconds at— | |
|---|---|---|---|---|
| | | | 5½ lb./in.$^2$ | 7½ lb./in.$^2$ |
| Unplasticized batch | 2,280 | 247 | 738 | 210 |
| Hexanebisdibutylamide | 2,100 | 413 | 25 | 10 |
| Ethanebisdibutylamide | 2,270 | 407 | | 41 |
| Nonanebisdibutylamide | 2,850 | 502 | | 71 |
| Butanebisdibutylamide | 2,410 | 243 | | 28 |
| Dibutyl phthalate (control) | 2,980 | 480 | 37 | 19 |
| Tricresyl phosphate (control) | 2,540 | 395 | 60 | 35 |

In the above table, a reduction in extrusion time indicates an increase in plasticity, that is, the more "plastic" the composition the more rapidly will it extrude, at a given pressure. It will be observed, that while all of the alkanebisdibutylamides tested produce a plasticizing effect on the copolymer the results produced by hexanebisdibutylamide are outstanding. The plasticizing effect of this compound is approximately double that produced by the dibutyl phthalate control and about 3 times that of the closest alkanebisdibutylamide. The hexanebisdibutylamide increases substantially the elongation at break of the unplasticized composition while increasing its tensile strength to only a trifling extent.

While the above describes the preferred embodiments of my invention, it is to be understood that departures may be made therefrom within the scope of the specification and claim.

What is claimed is:

A composition of matter comprising a rubber-like synthetic copolymer of 1,3-butadiene and acrylonitrile and an amount sufficient to effectively plasticize said copolymer of hexanebisdibutylamide.

ARTHUR W. CAMPBELL.

REFERENCES CITED

The following references are of record in the file of this patent:

UNITED STATES PATENTS

| Number | Name | Date |
|---|---|---|
| 2,325,947 | Garvey | Aug. 3, 1943 |
| 2,339,056 | Craver | Jan. 11, 1944 |